United States Patent [19]
Barnes

[11] Patent Number: 5,402,753
[45] Date of Patent: Apr. 4, 1995

[54] RATITE RESTRAINT DEVICE

[76] Inventor: John C. Barnes, FM 3447, P.O. Box 1531, Uvalde, Tex. 78802

[21] Appl. No.: 185,516

[22] Filed: Jan. 24, 1994

[51] Int. Cl.⁶ ............................................. A01K 29/00
[52] U.S. Cl. ..................................... 119/714; 2/69.5; 128/870
[58] Field of Search ..................... 119/714, 814, 712; 128/870, 873, 874, 876; 2/69.5

[56]  References Cited

U.S. PATENT DOCUMENTS

| | | | |
|---|---|---|---|
| 1,265,539 | 5/1918 | Slater | 2/69.5 |
| 2,948,278 | 8/1960 | Topa | 128/873 |
| 3,150,640 | 9/1964 | Nevitt | 119/712 |
| 3,323,150 | 6/1967 | Rehder | 128/875 |
| 4,137,870 | 2/1979 | Cano | 119/712 |
| 4,205,670 | 6/1980 | Owens | 128/875 |
| 4,589,407 | 5/1986 | Koledin et al. | 128/869 |
| 4,970,739 | 11/1990 | Bradford | 128/870 |
| 5,083,574 | 1/1992 | Schlutow | 128/870 |
| 5,109,801 | 5/1992 | Gahagan | 128/823 |
| 5,218,928 | 6/1993 | Muck et al. | 119/714 |

Primary Examiner—Paul J. Hirsch
Attorney, Agent, or Firm—Harrison & Egbert

[57] ABSTRACT

A ratite restraint device including a parent material section having a length dimension and a width dimension, a secondary material section affixed to one surface of the parent material section, and a plurality of straps affixed to an opposite surface of the parent material section. Each of the plurality of straps has an end extending outwardly beyond an edge of the parent material section. Each of the straps includes a buckle at one end. This buckle serves to receive an opposite end of the strap. The parent material section is made of a waterproof, tear-resistant mesh material. The secondary material section is centered along the length dimension of the parent material section. A plurality of webbing strips are affixed to an opposite surface of the parent material section. These webbing strips extend transverse to a longitudinal axis of the parent material section. The webbing strips define a plurality of loops for receiving the plurality of straps therein. The buckle is formed of a pair of D-rings affixed to one end of each of the plurality of straps.

14 Claims, 1 Drawing Sheet

RATITE RESTRAINT DEVICE

TECHNICAL FIELD

The present invention relates to restraining devices. More particularly, the present invention relates to jacket-type restraint devices that are used for the restraint of large birds.

BACKGROUND ART

There is a family of birds known as "ratites". These ratites are large bipeds such as ostriches and emus. Often, in the field of veterinary medicine, it is necessary to treat such ratites. Unfortunately, the temperament of such birds makes treatment of the birds difficult and dangerous. As such, a need has developed for the proper restraint of the bird during the medical treatment of the bird. Additionally, it is often necessary to properly transport the bird once it has been restrained.

In prior art techniques, an anesthetic has been administered to such ratites so as to place the birds into a sleep-like state. During this period of time, the veterinarian can properly apply the necessary treatment to the bird. Unfortunately, in most circumstances, the bird awakens violently from the anesthetic. This can create a dangerous situation for the veterinarian and the bird. As such, the need has developed so as to restrain the bird while the bird is subject to and recovering from anesthesia.

In the past, a variety of U.S. patents have issued relating to animal restraint devices. For example, U.S. Pat. No. 2,766,751, issued on Oct. 16, 1956 describes a body restraint device in which a material section has a plurality of belts connected thereto. These belts extend outwardly beyond an edge of the material section. Buckles are provided at an opposite end of the material section such that the material can be wrapped around a human body and the ends of the strap received by the buckles. This device has been used for the restraint of human beings and has a length so as to extend around the human body.

U.S. Pat. No. 3,150,640, issued on Sep. 29, 1964, to K. R. Nevitt discloses a protective restraint bag for animals. This restraint bag has a neck opening which is adjustable in its circumferential extent. The animal is placed into the interior of the bag such that the claws of the animal are contained within the bag. The bag has sufficient flexibility and thinness so as to permit ready anatomical identification by feeling therethrough.

U.S. Pat. No. 3,361,132, issued on Jan. 2, 1968 to S. B. Rentsch, Jr. teaches a restraining Jacket that is particularly designed so as to fit around a human body. The restraint device includes fasteners along a longitudinal edge of a material section. These fasteners engage corresponding fasteners on the opposite longitudinal edge of the material section.

U.S. Pat. No. 3,399,670, issued on Sep. 3, 1968, to J. K. Veasey describes another type of restraining device. This restraining device is generally of a rectangular configuration. The device has dowels placed within the ends of the rectangular section. Straps extend around the material for the purpose of engaging buckles on the other side of the material. The dowels provide a hand hold and grip so as to properly manipulate the person secured within the restraining device.

U.S. Pat. No. 3,817,245, issued on Jun. 18, 1974, to M. M. Kroeger shows a removable cushion for restraining devices. This device employs fasteners along the back side of the cushion so as to hold the cushion in a fixed position against the patient's body. Belts are provided around the restraining device so as to properly secure the restraining device around the person.

U.S. Pat. No. 4,137,870, issued on Feb. 6, 1979, to M. A. Cano provides a device for restraining animals for the purposes of treatment. This device employs a pair of sheets which are cut so that each is wider at one end and narrower at the other end. The sheets are united along one longitudinal edge. The wider end forms a bag and the free portions of the sheets can be wrapped around the animal in selective overlapping relationship according to the size of the animal. A neck band is formed near the head of the animal. A suitable fastener is provided along the free end of the sheets so as to allow the sheets to be sealed together for the purposes of restraining the animal.

U.S. Pat. No. 5,109,801, issued on May 5 1992 to V. S. Gahagan teaches an animal restraining device in which a sleeve of material has a large opening at one end and a smaller head opening at the other end. Straps are provided which extend through loops formed on the body of the material. The straps are positioned so as to be below the feet of the animal positioned within the animal restraint. The straps are provided so that the legs of the animal are folded comfortably beneath the animal. This device has been particularly configured for receiving cats and dogs therein.

It is an object of the present invention to provide a ratite restraint device that safely contains the ratite therein during anesthetic recovery.

It is another object of the present invention to provide a ratite restraint device that facilitates the transport of the secured ratite.

It is a further object of the present invention to provide a ratite restraint device which provides sufficient strength and durability to retain the ratite therein.

It is still a further object of the present invention to provide a ratite restraint device that is easy to use and disinfect, easy to manufacture, and relatively inexpensive.

These and other objects and advantages of the present invention will become apparent from a reading of the attached specification and appended claims.

SUMMARY OF THE INVENTION

The present invention is a ratite restraint device that comprises a parent material section having a length dimension and a width dimension, a secondary material section affixed to one surface of the parent material section, and a plurality of straps affixed to an opposite surface of the parent material section. Each of the straps has an end extending outwardly beyond an edge of the parent material section. Each of the straps has a buckle at one end. This buckle serves to receive an opposite end of the strap.

The parent material section is of a generally waterproof tear-resistant mesh material. Specifically, the parent material section is of a vinyl-coated nylon material. The secondary material section is centered along the length dimension of the parent material section. The secondary material section extends along a width dimension of the parent material section.

The present invention further includes a plurality of webbing strips affixed to an opposite surface of the parent material section. These webbing strips extend transverse to a longitudinal axis of the parent material section. The webbing strips receive the plurality of straps. The webbing strips are threadedly affixed to both the parent material sections and to the secondary material section. Each of the webbing strips has a plurality of loops formed therein. These loops define a passageway aligned parallel to the longitudinal axis of the parent material section. The loops are defined by an inner surface of the webbing strips and by an outer surface of the parent material section. The straps extend through the loops of the webbing strips such that each of the straps is maintained in parallel relationship to each other. Each of the webbing strips has six loops formed therein. The plurality of straps includes four straps. The plurality of straps are received by four of the loops of each of the webbing strips.

The buckle of the present invention includes a pair of D-rings which are affixed to the one end of each of the plurality of straps.

DETAILED DESCRIPTION OF THE INVENTION

Figure 1:
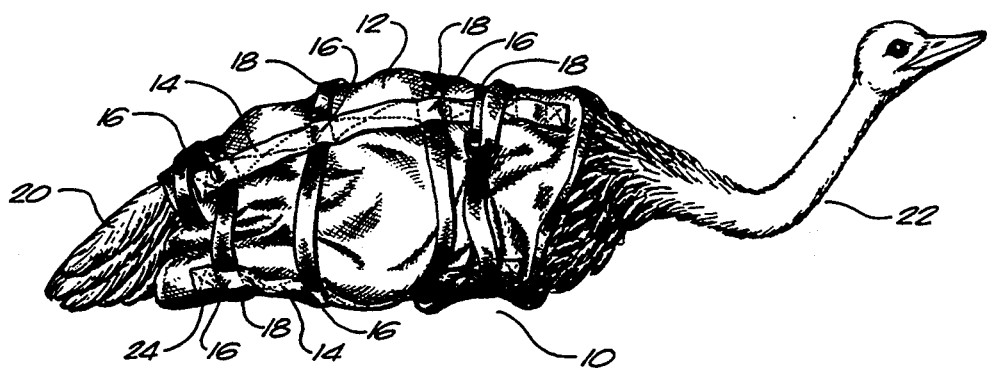
FIG. 1 is a side elevational view showing a ratite restraint device with a ratite contained therein.

Referring to FIG. 1, there is shown at 10 the ratite restraint device in accordance with the preferred embodiment of the present invention. The ratite restraint device 10 includes a parent material section 12 having a length dimension and a width dimension. A plurality of webbing strips 14 are affixed to an outer surface of the parent material section 12. These webbing strips 14 extend transverse to the length dimension of the parent material section 12. Each of the webbing strips 14 has a plurality of loops 16 formed therein. A plurality of straps 18 extend through the loops 16 of the webbing strips 14. As will be described hereinafter, each of the straps 18 has an end which extends outwardly beyond an edge of the parent material section 12. A buckle is provided at an end of each of the straps 18 such that the buckle can receive an opposite end of the strap.

As can be seen in FIG. 1, the length dimension of the parent material section 12 extends around the body 20 of the ratite 22. The legs 24 of the ratite 20 are restrained within an interior of the parent material section 12. The width dimension of the parent material section 12 extends along the length of the body 20 of the ratite 22. In the position shown in FIG. 1, the ratite 22 is properly restrained for the administration of a veterinary treatment. The straps 18 can be Grasped by a person for the purpose of lifting the ratite 22 or for the purpose of transportation of the ratite 22.

As will be described hereinafter, the ratite restraint device 10 is particularly configured so as to restrain the legs 24 of the ratite 22 therein. The ratite 22 is an extremely strong bird that would have the ability to break through many cloth-type restraining devices. As such, so as to apply the Greatest strength to the parent material section 12, where it is needed most, the straps 18 extend along the length dimension of the parent material section 12. As such, the straps 18 will extend around the body 20 and underneath the legs 24 of the ratite 22. Additionally, in further restraint of the ratite 22, the interior surface of the parent material section 12 can includes a secondary material section therein. The secondary material section is also configured so as to be positioned below the legs 24 of the ratite 22. The parent material section 12 is of a mesh material. When the restraint device 10 is positioned around the ratite 22, the mesh material (around the top of the body) will allow air to pass therethrough to the ratite.

The parent material section 12 is of a waterproof tear-resistant material. The material can be a tarpoline material, such as vinyl-coated nylon. This material is a mesh-type of tear-resistant material. The straps 18 are made of a nylon material.

Figure 2:
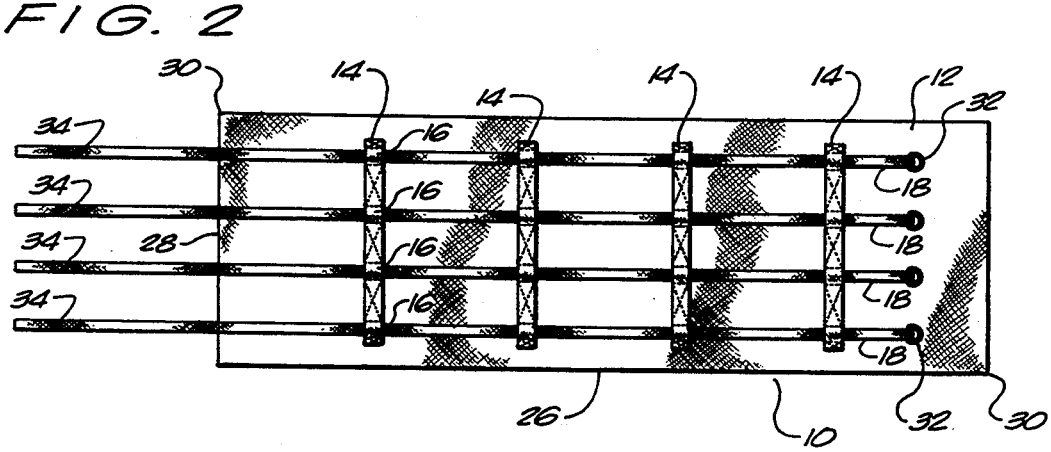
FIG. 2 is a plan view of an exterior surface of the ratite restraint device.

Referring to FIG. 2, there is shown an exterior view of the ratite restraint device 10. In FIG. 2, it can be seen that the parent material section 12 has a length dimension 26 and a width dimension 28. The corners 30 of the parent material section 12 are generally rounded so as to minimize the amount of material. Importantly, in FIG. 2, it can be seen that the webbing strips 14 are affixed to the surface of the parent material section 12. The webbing strips 14 extend transverse to the length dimension 26 of the parent material section 12. Each of the webbing strips 14 is threadedly affixed to the parent material section 12.

In the attachment of the webbing strips 14 to the parent material section 12, a plurality of loops 16 are formed therein. The manner of stitching the webbing strip 14 to the parent material section 12 creates a loop-type area between an inner surface of the webbing strips 14 and the outer surface of the parent material section 12. As such, these loops 16 provide an area for the receipt of the straps 18 therethrough. A total of six loops are provided along the length of each of the webbing strips 14. As can be seen, there are a total of four straps 18 which extend through four of the loops 16 on the webbing strips 14. The straps 18 are received within the loop 16 of the webbing strips 14 such that the straps are maintained in generally parallel relationship to each other. The two additional loops 16 on the webbing strips 14 (which do not receive the straps 18) are provided for additional flexibility of the ratite restraint device 10. The unoccupied loops 16 can be used for the receipt of an additional strap, or can be used so as to facilitate the introduction of a transport strap, or can be used to receive a loose end of one of the straps 18.

As can be seen in FIG. 2, each of the loops 16 defines a passageway for the strap 18. This passageway is aligned parallel to the length dimension 26 and longitudinal axis of the parent material section 12.

In FIG. 2, it can be seen that buckles 32 are provided at one end of each of the straps 18. The buckles 32 are, in the preferred embodiment of the present invention, a pair of D-rings. Alternatively, the buckles 32 can be any other type of quick-release buckle which allows for the easy fastening and receipt of the opposite end 34 of the straps 18. As can be seen, the buckle end of the straps 18 extends outwardly beyond an end of the parent material section 12. Similarly, the opposite end 34 of the straps 18 also extends outwardly beyond an edge of the parent material section 12. In normal use, the end 34 of the strap 18 will engage the buckle 32. When the buckle 32 is a pair of D-rings, the end 34 is woven through the rings 32 for the purpose of securing the ratite within the interior of the ratite restraint device 10. However the bird is situated within the ratite restraint device 10, the strong straps 18 will extend around the body of the bird and will retain the legs of the bird within the parent material section 12.

Figure 3:
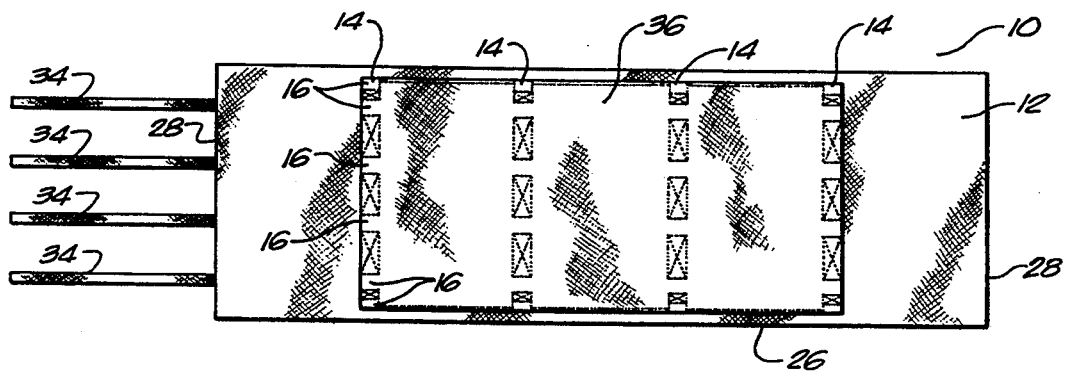
FIG. 3 is a plan view of an interior of the ratite restraint device of the present invention.

FIG. 3 shows an interior view of the ratite restraint device 10 in accordance with the present invention. In the illustration of FIG. 3, it can be seen that a secondary material section 36 is affixed to a surface of the parent material section 12. The secondary material section 36 is a cloth layer which is generally centered along the length dimension 26 of the parent material section 12. The secondary material section 36 will extend generally across the width dimension 28 of the parent material section 12. The secondary material section 36 is made of a strong marine cloth so as to further facilitate the proper restraint of the bird within the interior of the ratite restraint device 10. The secondary material section 36 is threadedly affixed to the surface of the parent material section 12. Importantly, in FIG. 3, it can be seen that the webbing strips 14 are threadedly affixed to both the parent material section 12 and to the secondary material section 36. The manner of stitching the webbing strips 14 to the secondary material section 36 further facilitates the strong construction of the restraint device 10 of the present invention.

In FIG. 3, it can be seen that the ends 34 of the strap 18 extend outwardly beyond the edge of the parent material section 12. The buckle end 32 of the straps 18 also extends outwardly beyond an edge of the parent material section 12. For the purposes of illustration, it can be seen that two of the straps 18 have a buckle end which does not extend beyond the edge of the parent material section 12.

For the specific configuration of the present invention, the parent material section 12 has a length of eighty-two inches and a width of forty inches. The secondary material section 32 has a length of sixty inches and a width of forty inches. The secondary material section 36 is centered between the ends of the parent material section 12. The webbing strips 14 are generally grouped within the area defined by the secondary material section 36. Each of the straps 18 has a length of approximately one hundred and ten inches. As such, the present invention has a sufficient size and capacity for the restraint of very large ratites.

The use of the flexible material for the ratite restraint device 10 of the present invention allows the restraining device to properly conform to the odd shape of the ratite. The use of the reinforcing secondary material section 36 strengthens the device where it is needed the most. Additionally, and very importantly, this material allows the ratite to stay cool since the mesh portion of the parent material section 12 is positioned on the top of the body 20 at the ratite 22. This allows air to flow through the mesh material and to reach the ratite 22. The ratite restraint device 10 is easy to attach and to remove.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A ratite restraint device comprising:

a parent material section having a length dimension and a width dimension, said parent material section being of a tear-resistant mesh material, said mesh material having a weave structure suitable for allowing air to pass freely therethrough;

a secondary material section affixed to one surface of said parent material section, said secondary material section being centered along and within said length dimension of said parent material section, said secondary material section extending across and within a width dimension of said parent material section, said secondary material section affixed across said width dimension to said parent material section;

a plurality of straps affixed to an opposite surface of said parent material section, each of said straps having an end extending outwardly beyond an edge of said parent material section, each of said straps having a buckle means at one end, said buckle means for receiving an opposite end of the strap.

2. The device of claim 1, further comprising:

a plurality of webbing strips affixed to said opposite surface of said parent material section, said webbing strips extending transverse to a longitudinal axis of said parent material section, said webbing strips receiving said plurality of straps.

3. The device of claim 2, said webbing strips being threadedly affixed to said parent material section.

4. The device of claim 3, said webbing strips being directly threadedly affixed to said parent material section and to said secondary material section.

5. The device of claim 2, each of said webbing strips having a plurality of loops formed thereon, each of said loops defining a passageway aligned parallel to said longitudinal axis of said parent material section.

6. The device of claim 2, said plurality of straps extending through said loops of said webbing strips, each of said straps in parallel relationship to an adjacent strap.

7. The device of claim 5, each of said webbing strips having six loops formed therein, said plurality of straps comprising four straps, said plurality of straps received by four of said loops on each of said webbing strips.

8. The device of claim 1, said buckle means comprising:

a pair of D-rings affixed to said one end of each of said plurality of straps.

9. A ratite restraint device comprising:

a parent material section having a length dimension and a width dimension;

a secondary material section centered along said length dimension of said parent material section, said secondary material section extending generally across a width dimension of said parent material section;

a plurality of webbing strips affixed to a surface of said parent material section, said plurality of webbing strips extending transverse to said length dimension of said parent material section, each of said webbing strips having a plurality of loops formed therein, said secondary material section affixed to a surface of said parent material section opposite said plurality of webbing strips, each of said plurality of webbing strips being directly threadedly affixed to said parent material section and to said secondary material section; and a plurality of straps extending through said loops of said plurality of webbing strips, each of said straps having an end extending outwardly beyond an edge of said parent material section, each of said straps having a buckle means at one end, said buckle means receiving an opposite end of the strap.

10. The device of claim 9, said parent material section being of a waterproof, tear-resistant mesh material.

11. The device of claim 9, each of said plurality of loops defined by a surface of a webbing strip and said surface of said parent material section, each of said plurality of straps interposed between said surface of said webbing strips and said surface of said parent material section.

12. The device of claim 9, said plurality of straps extending outwardly said length dimension of said parent material section, said plurality of straps extending transverse to said plurality of webbing strips.

13. The device of claim 9, each of said webbing strips having six loops formed therein, said plurality of straps comprising four straps, said plurality of straps received by four of said loops on each of said webbing strips.

14. The device of claim 9, said buckle means comprising:
   a pair of D-rings affixed to said one end of each of said plurality of straps.

* * * * *